United States Patent
Ohmura et al.

(10) Patent No.: US 8,122,461 B2
(45) Date of Patent: Feb. 21, 2012

(54) OPTICAL DISC DEVICE HAVING A PLURALITY OF TRAYS WITH A CAM FOR CONTACTING THE PLURALITY OF TRAYS

(75) Inventors: Yoshikazu Ohmura, Ishikawa (JP); Tsukasa Nakayama, Kanagawa (JP)

(73) Assignee: Panasonic Corporation, Osaka (JP)

( * ) Notice: Subject to any disclaimer, the term of this patent is extended or adjusted under 35 U.S.C. 154(b) by 924 days.

(21) Appl. No.: 12/063,958

(22) PCT Filed: Jul. 21, 2006

(86) PCT No.: PCT/JP2006/314515
§ 371 (c)(1),
(2), (4) Date: Feb. 15, 2008

(87) PCT Pub. No.: WO2007/020772
PCT Pub. Date: Feb. 22, 2007

(65) Prior Publication Data
US 2009/0254928 A1   Oct. 8, 2009

(30) Foreign Application Priority Data

Aug. 16, 2005  (JP) .............................. P.2005-235755

(51) Int. Cl.
*G11B 17/03*  (2006.01)
*G11B 17/04*  (2006.01)
*G11B 33/04*  (2006.01)
*G11B 17/26*  (2006.01)

(52) U.S. Cl. ...................................................... 720/614

(58) Field of Classification Search .................. 720/611, 720/614, 632, 651, 652, 657
See application file for complete search history.

(56) References Cited

U.S. PATENT DOCUMENTS

| 2001/0010675 A1* | 8/2001 | Matsuda et al. ............. 369/77.1 |
| 2004/0017741 A1* | 1/2004 | Tatehata et al. ............ 369/30.85 |

FOREIGN PATENT DOCUMENTS

| JP | 6-131793 A | 5/1994 |
| JP | 10-64160 A | 3/1998 |
| JP | 10-149606 A | 6/1998 |
| JP | 2000-57678 A | 2/2000 |
| JP | 2001-101762 A | 4/2001 |
| JP | 2002-100103 A | 4/2002 |
| JP | 2003-338112 A | 11/2003 |
| JP | 3553425 B2 | 5/2004 |

OTHER PUBLICATIONS

International Search Report for PCT/JP2006/314515, dated Aug. 15, 2006.

* cited by examiner

*Primary Examiner* — Craig A. Renner
*Assistant Examiner* — Gustavo Polo
(74) *Attorney, Agent, or Firm* — RatnerPrestia

(57) ABSTRACT

An optical disc device is disclosed. In the optical disc device, a cam portion configured to include a holder that is supported on the outside of a cam member to turn and move vertically is provided in a position that is in vicinity of a tray being supported by elevator cam gears. In disc loading/ejecting operations, the cam portion is turned and a projecting portion pushes down a tray projecting portion of the tray, so that a space S if formed between the tray and the disc. Since the tray is shaped into a closed circular tray, a rigidity of the tray can be ensured and also the space used to avoid a contact between a projecting portion on a lower face of the disc and a surface of the tray can be provided by bending the tray.

3 Claims, 7 Drawing Sheets

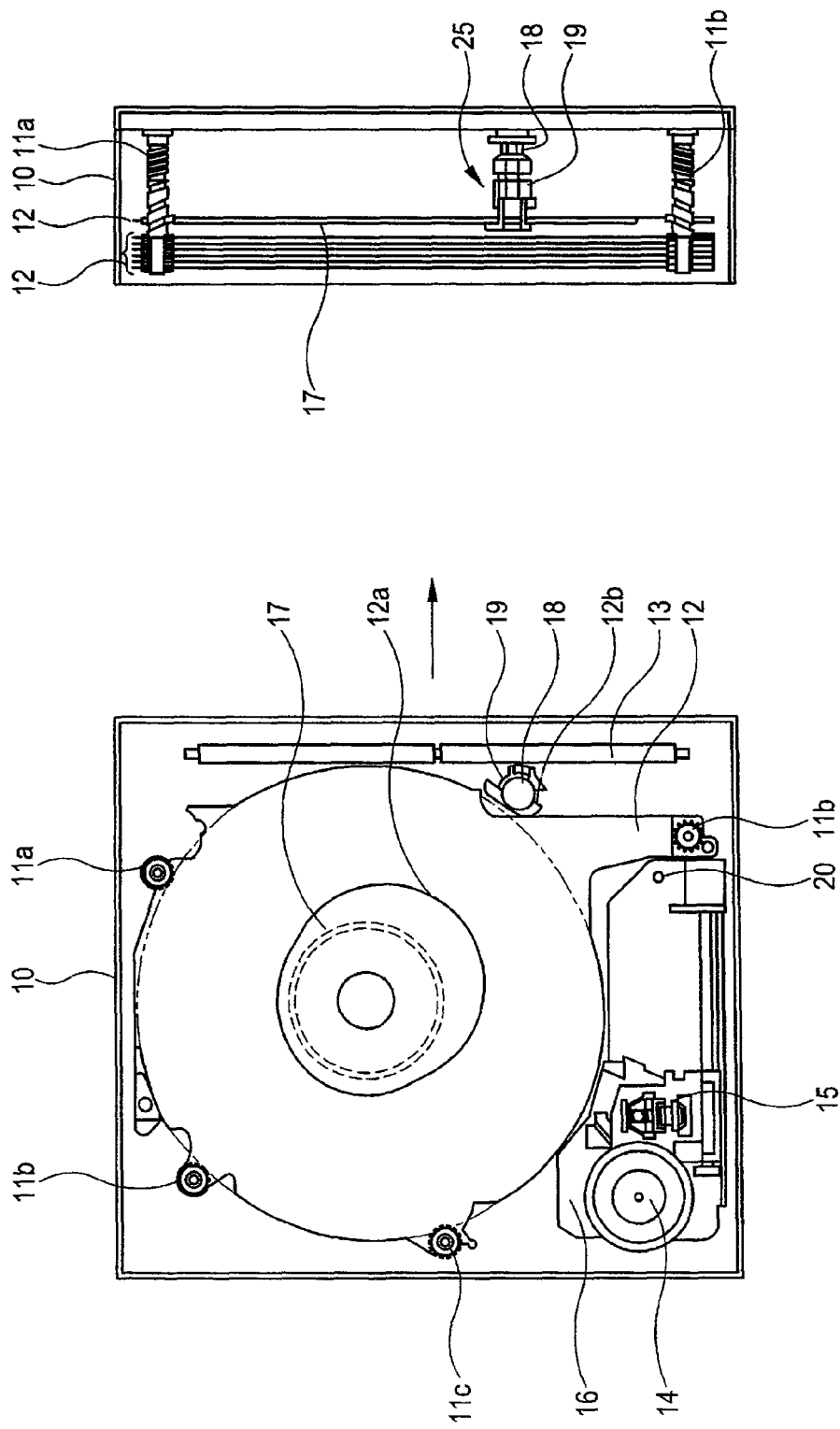

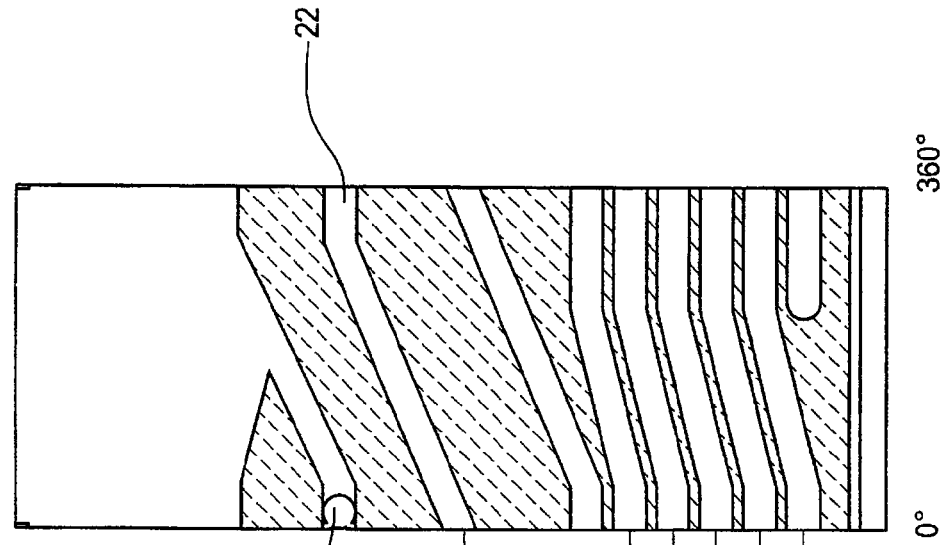
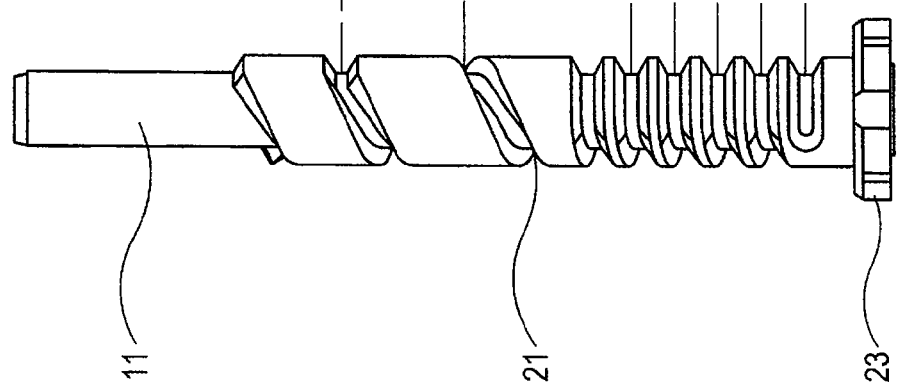

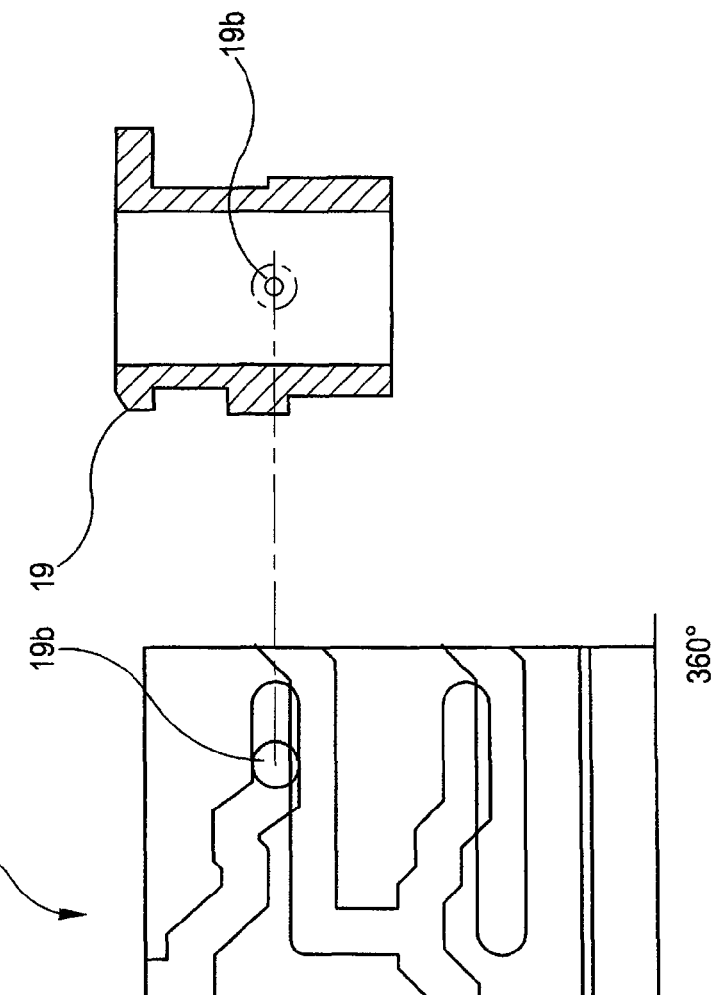
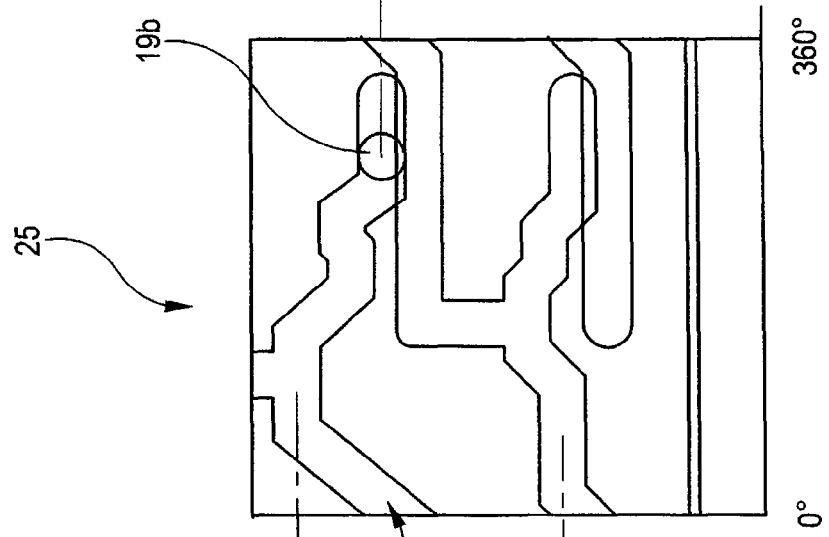
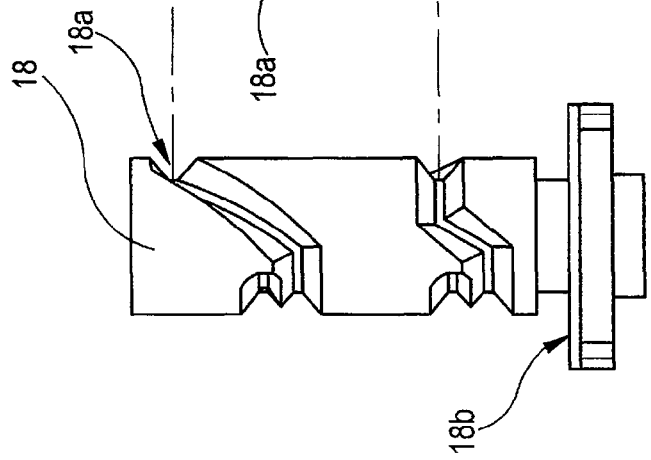

OPTICAL DISC DEVICE HAVING A PLURALITY OF TRAYS WITH A CAM FOR CONTACTING THE PLURALITY OF TRAYS

This application is a U.S. National Phase Application of PCT International Application PCT/JP2006/314515.

TECHNICAL FIELD

The present invention relates to a disc device equipped with a plurality of trays that are arranged in a stacked fashion and can load plural sheets of discs individually thereon.

BACKGROUND ART

In the prior art, a multiple-disc changer type disc device for storing plural sheets of discs such as the optical discs in the inside of a disc device main body and then choosing a desired disc to record/play has been developed (see Patent Literature 1, Patent Literature 2, for example).

In an optical disc device 100 in the prior art, as shown in FIG. 7, a slot 103 for inserting the media is provided on a front panel of a main body 101. On the inner side of the slot 103 of the main body 101, a carrying roller 104 is provided rotatably perpendicularly to the inserting direction. On the inner side of the optical disc device 100 rather than the carrying roller 104, a plurality of trays 107 are provided in a vertically stacked manner. The tray 107 can be moved vertically by an elevator mechanism (not shown), and the tray 107 chosen in loading or unloading an optical disc 102 is moved up to the same height as the slot 103. In the disc device 100, a notch 111 is provided to the tray 107 such that the tray 107 does not interfere with a turn arm 110 when positioned in a recording/playing position. Therefore, the optical disc 102 being held in the tray 107 can be held directly by a turntable 108 on the turn arm 110, and the tray 107 can be put down without interference with the turn arm 110.

Patent Literature 1: JP-A-2002-100103
Patent Literature 2: JP-A-2003-338112

DISCLOSURE OF THE INVENTION

Problems that the Invention is to Solve

However, in the optical disc device in the prior art, in some cases the outer periphery of the tray 107 is not continued and the tray 107 is short of rigidity and is deformed. Also, in some cases a projection (not shown) provided on the recording face side of the disc 102 is stuck in ejecting the disc after the tray 107 is moved up to the same height as the slot 103, so that the disc loading and unloading operations cannot be smoothly executed.

The present invention has been made to solve the above problem, and it is an object of the present invention to provide a disc device capable of achieving a size reduction by ensuring a rigidity of a tray and also executing a stable operation by preventing such a situation that a projection on the recording face side of the disc is stuck.

Means for Solving the Problems

An optical disc device of the present invention includes a plurality of trays for loading discs thereon respectively; a tray holding member that holds the plurality of trays in a stacked manner so as to be movable; and a cam member that is provided so that the cam member is engaged with and disengaged from the tray. The tray is pushed down when the cam member engages with the tray.

According to this configuration, a predetermined space can be formed below or over the disc in moving the disc to eject.

Advantages of the Invention

As apparent from the above explanation, according to the present invention, the disc device capable of preventing such a situation that the projection provided on the recording face side of the disc is stuck, while ensuring a rigidity of the tray can be provided.

BRIEF DESCRIPTION OF THE DRAWINGS

FIG. 2(a) is a schematic top view of the disc device of the embodiment of the present invention in mounting the disc, and FIG. 2(b) is a right side view of the disc device of the embodiment of the present invention in mounting the disc.

FIG. 3(a) is a side view of an elevator cam gear of the disc device of the embodiment of the present invention, and FIG. 3(b) is a cam development view of the elevator cam gear of the disc device of the embodiment of the present invention.

FIG. 4(a) is a schematic explanatory view of a cam member in a cam portion of the disc device of the embodiment of the present invention, FIG. 4(b) is a development view of the cam member in the cam portion of the disc device of the embodiment of the present invention, and FIG. 4(c) is a schematic explanatory view of a holder of the cam portion of the disc device of the embodiment of the present invention.

Figure 1B:
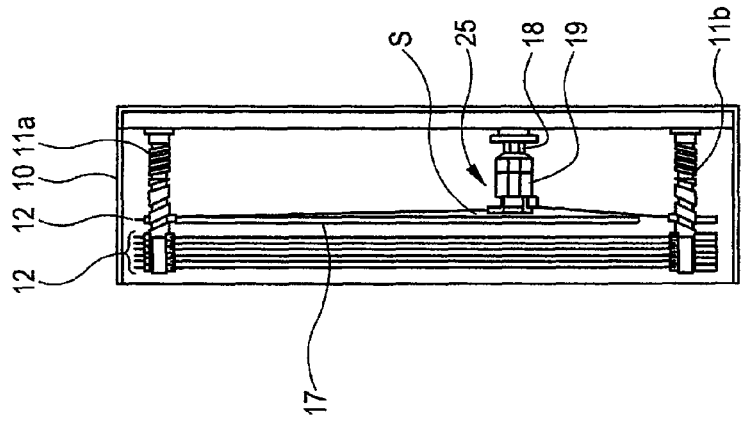
FIG. 1(b) is a right side view of the disc device of the embodiment of the present invention in loading/ejecting the disc.

DESCRIPTION OF REFERENCE NUMERALS AND SIGNS 10 main body (optical disc device)
11 elevator cam gear (tray holding member)
12 tray
13 carrying roller
15 optical head portion
17 disc
18 cam member
19 holder
20 pivot
21 cam groove
22 cam point
23 gear portion
24 boss portion
25 cam portion
61 turn portion S space (clearance between an upper surface of a tray and a lower surface of the disc loaded on the tray)

BEST MODE FOR CARRYING OUT THE INVENTION

An embodiment of the present invention will be explained with reference to the drawings hereinafter.

Figure 1A:
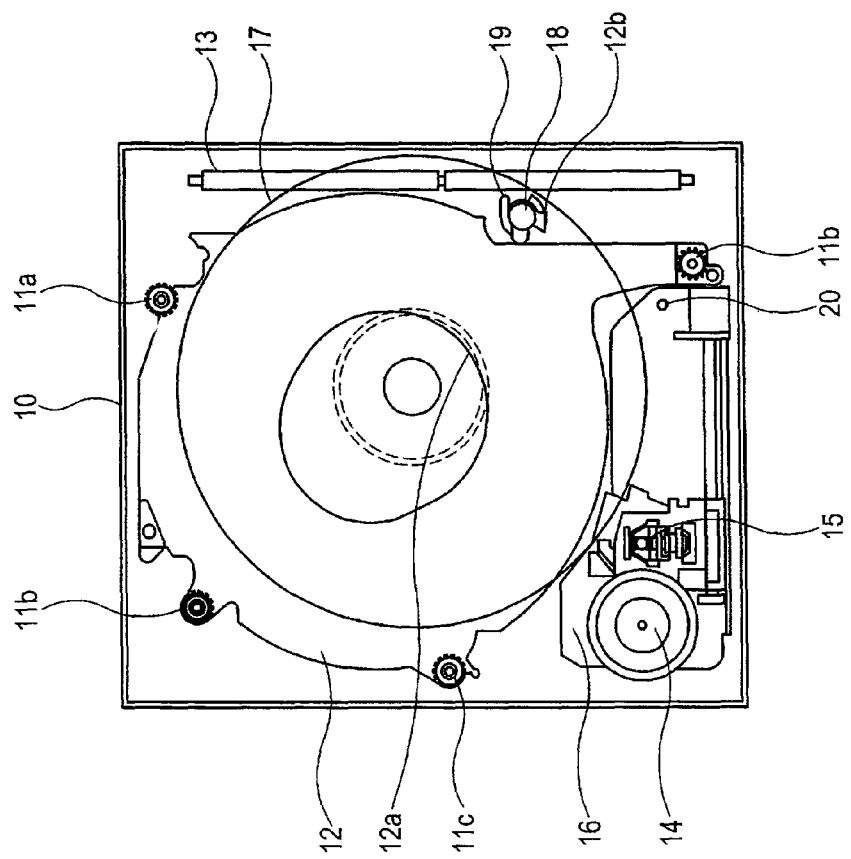
FIG. 1(a) is a schematic top view of a disc device of an embodiment of the present invention in loading/ejecting the disc.

FIG. 1(a) and FIG. 2(a) are major top views of an optical disc device that is mounted in a car audio system respectively, and FIG. 1(b) and FIG. 2(b) are right side views corresponding to the same respectively. Here, FIG. 1 shows loading/ejecting operations of the disc, and FIG. 2 shows a disc mounted state.

As shown in FIG. 1 and FIG. 2, the disc device of the embodiment of the present invention includes a main body 10 for housing a plurality of discs 17 therein, a plurality of stacked trays 12 for holding each disc 17 individually in the inside of the main body 10, and a turn arm 16 that can be turned on a pivot 20 that is in parallel with the stacked direction of respective trays 12. Also, the turn arm 16 has a turntable 14 that holds the disc 17 at its top end to turn it, and supports movably an optical head portion 15 that applies the recording/playing operation to the disc.

The tray 12 is shaped into a substantially circular disc as a whole. Each tray is formed of an aluminum plate, or the like and has flexibility as a single body over the whole. Also, an almost circular hollow portion 12a is provided in the center portion, and the tray 12 can has a high rigidity because it has a closed circular shape. Also, a part of the tray 12 protrudes to the outside of the tray 12, and an elevator through hole is provided at plural locations. Also, elevator cam gears 11 (11a, 11b, 11c) as an elevating cam body for lifting up/down the tray are provided as a tray holding member to pass through the elevator through holes vertically.

Also, in FIG. 1(a) or FIG. 2(a), carry roller 13 paired vertically are provided on the inside of the slot (not shown) on the right side of the main body 10. The carry rollers 13 are rotated forwardly/reversely by a driving mechanism (not shown). Thus, the disc 17 inserted through the slot is loaded, and the disc 17 whose recording or playing is ended is ejected through the slot.

FIG. 3 shows details of the elevator cam gear 11 for lifting up/down the tray, wherein FIG. 3(a) is a side view of the elevator cam gear, and FIG. 3(b) is a cam development view in which a peripheral surface of the elevator cam gear 11 is replaced with a flat surface. In FIG. 3, a cam groove 21 with which the tray 12 is engaged is formed on the outer peripheral surface of the elevator cam gear 11, and a gear portion 23 is formed integrally at the bottom portion of the elevator cam gear 11. Thus, the driving mechanism (not shown) and the gear portion 23 are engaged with each other, and the elevator cam gear 11 is turned/driven. Accordingly, a boss portion 24 of the tray 12 that engages with the cam groove 21 is moved along with the cam groove 21 by the turning of the elevator cam gear 11, and thus the tray 12 is moved vertically. In this case, a tray height at which the disc 17 can be loaded/ejected is set to a height of a cam point 22 of the cam groove 21 in the position where the boss portion 24 of the tray 12 engages with the cam groove 21. In loading/ejecting the disc, the elevator cam gear 11 is turned/driven by the driving mechanism (not shown), and then the boss portion 24 of the tray 12 is moved to the position of the cam point 22 to execute the disc loading/ejecting operation.

Figure 5A:
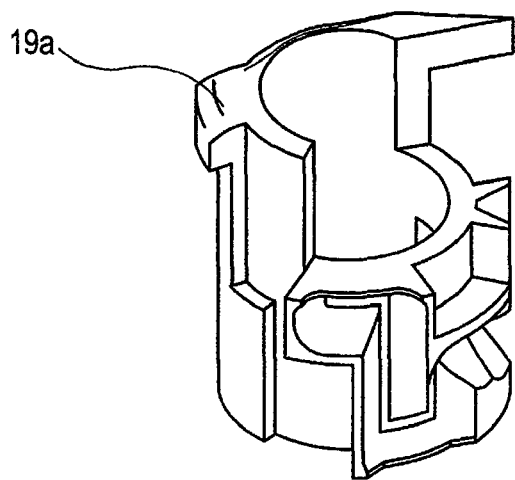
FIG. 5(a) is a perspective view of the holder of the cam portion of the disc device of the embodiment of the present invention.
Figure 5B:
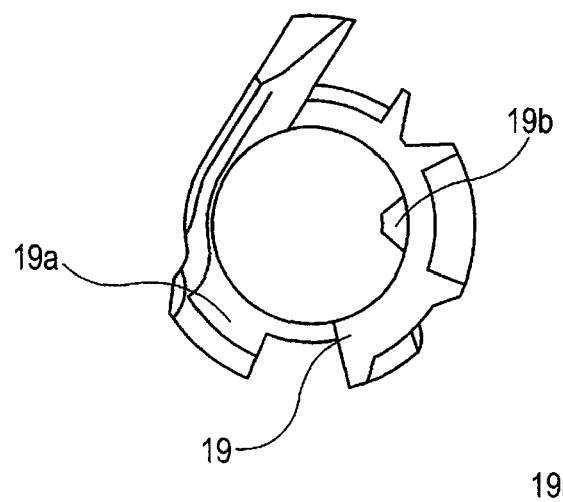
FIG. 5(b) is top view of the holder of the cam portion of the disc device of the embodiment of the present invention.
Figure 5C:
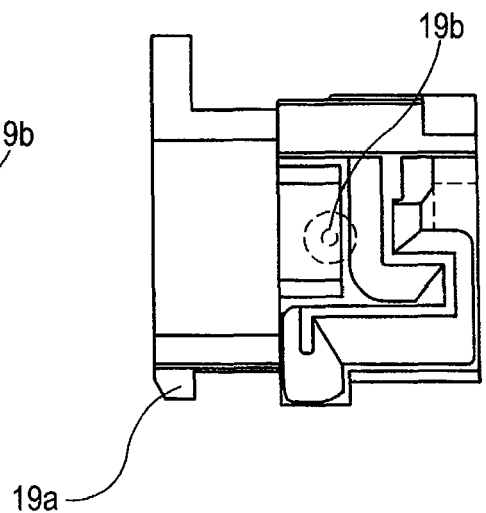
FIG. 5(c) is a side view of the holder of the cam portion of the disc device of the embodiment of the present invention.

FIG. 4 and FIG. 5 are views showing details of a cam portion 25 that is engaged with and disengaged from the tray 12, wherein FIG. 4(a) is a side view of a cam member 18, FIG. 4(b) is a development view in which a peripheral surface of the cam member 18 is replaced with a flat surface, and FIG. 4(c) is a sectional view of a holder 19. The cam portion 25 is configured to have the cam member 18 shaped into a circular cylinder as a whole and having a gear portion 18b that engages with a turning mechanism (not shown) and turned/driven by this mechanism, and the holder 19 supported on the outside of the cam member 18 to turn and move vertically. In FIG. 4, the cam member 18 is illustrated in a position that is away from the holder 19, but actually the cam member 18 and the holder 19 are engaged with each other, as shown in FIG. 1 and FIG. 2.

A first cam groove 18a formed as shown in FIG. 4(b) when developed is provided on the outer peripheral surface of the cam member 18. A cam projection 19b that engages with the first cam groove 18a is provided on the inner peripheral surface of the holder 19. Also, a holder projecting portion 19a that contacts a tray projecting portion 12b of the tray 12 is provided on the outer peripheral surface of the holder 19. As a result, the holder 19 is turned and moved vertically along with the turn of the cam member 18.

Figure 6A:
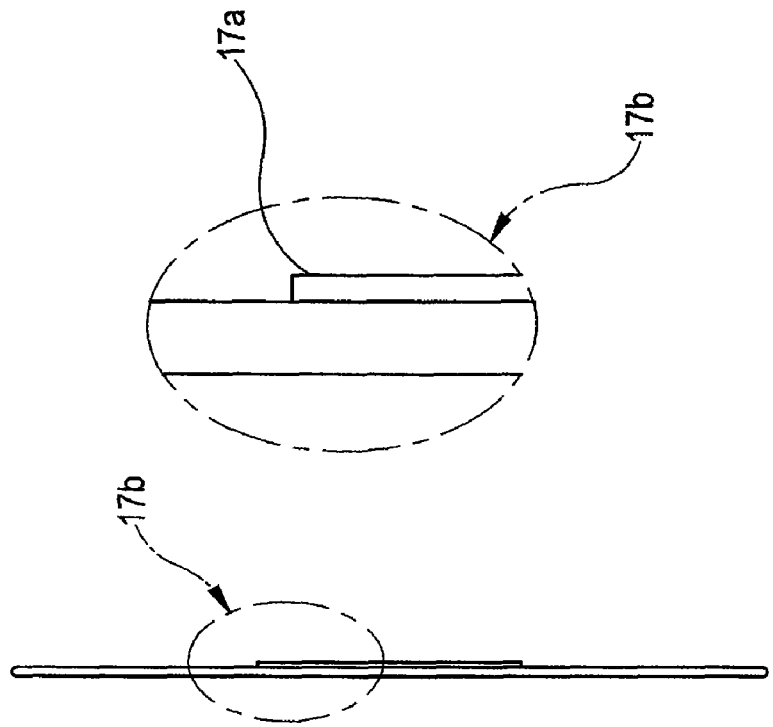
FIG. 6(a) is a front view showing a shape of the disc.
Figure 6B:
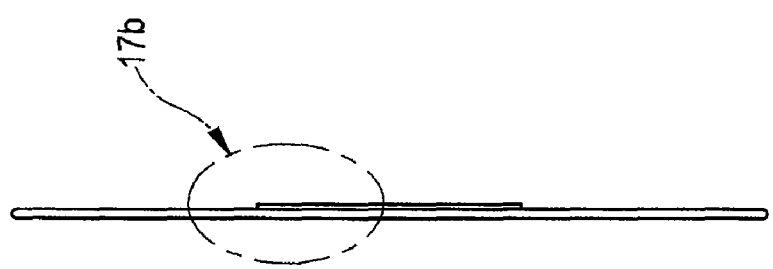
FIG. 6(b) is a side view showing the shape of the disc.
Figure 6C:
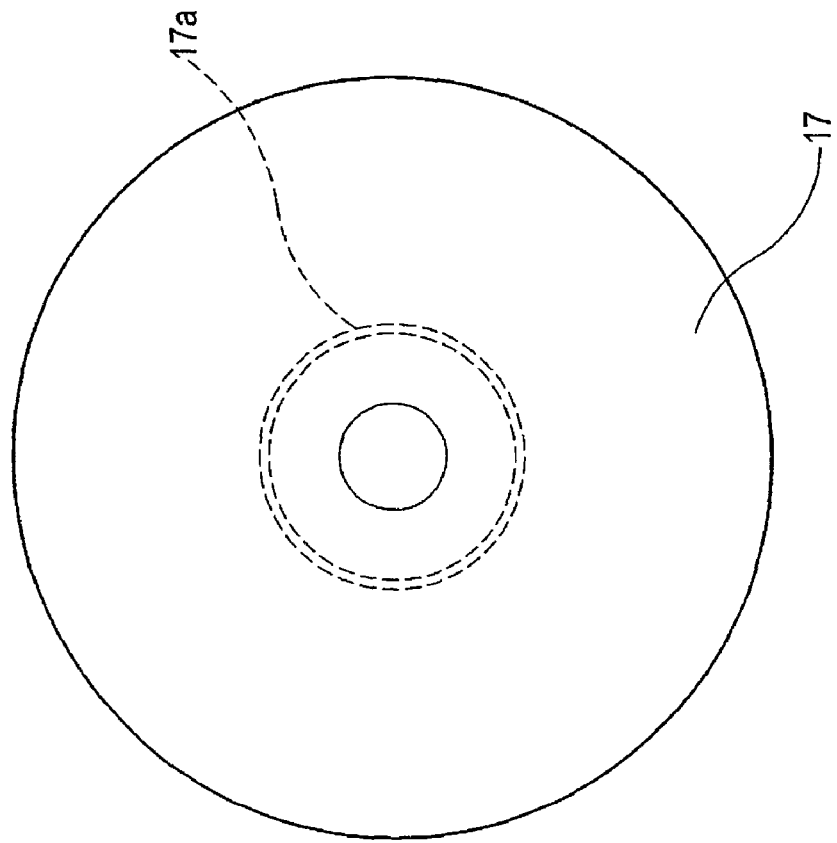
FIG. 6(c) is an enlarged view showing the shape of the disc.
Figure 7:
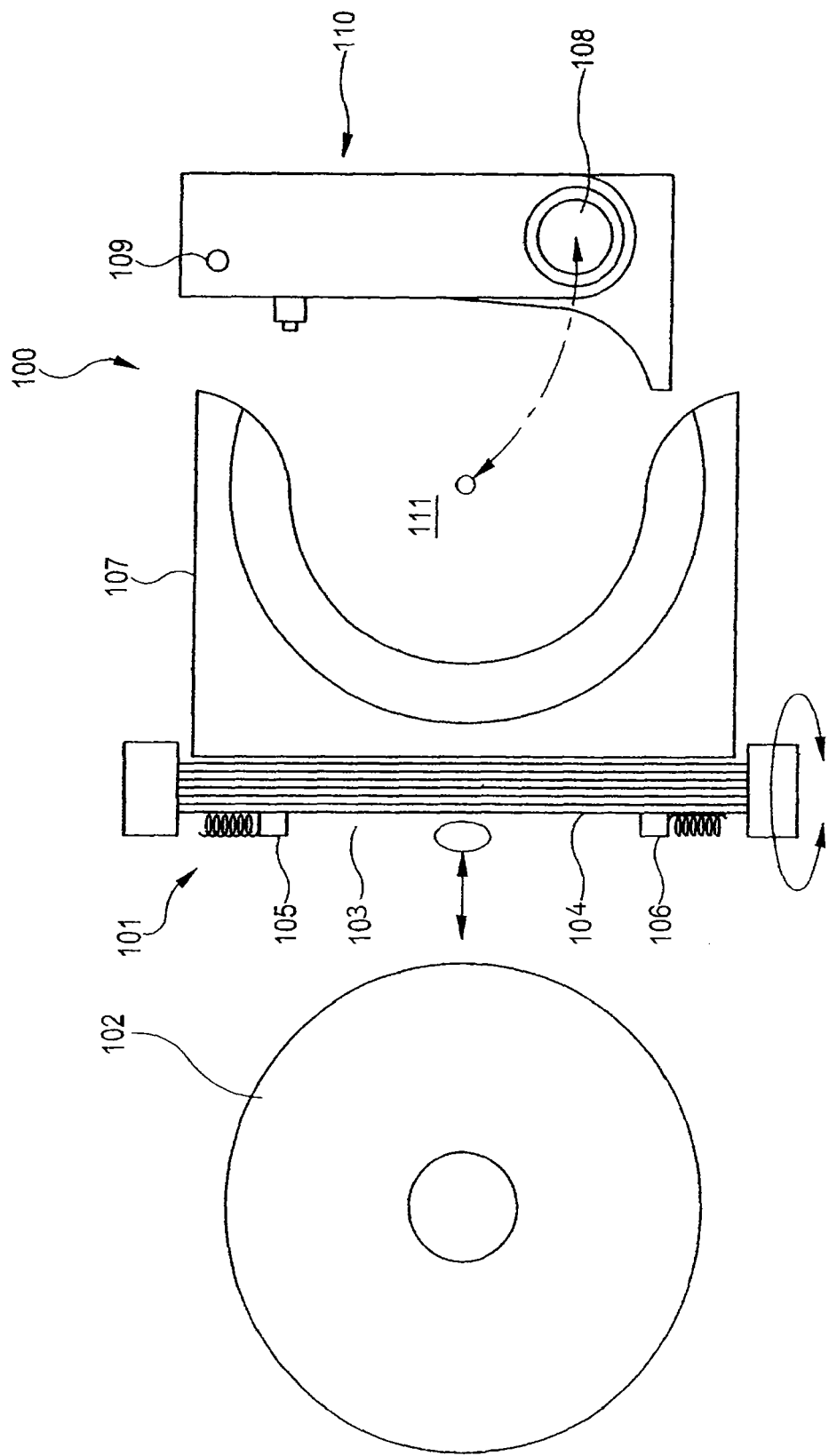
FIG. 7 is a schematic plan view of an optical disc device in the prior art.

A shape of the disc is shown in FIG. 6. An annular projecting portion 17a is formed on the recording face side of the disc 17 in a position that is on the outer peripheral side of the center hole and on the inner peripheral side of the recording area.

As shown in FIG. 1, in a situation that all trays 12 holding the disc 17 respectively are positioned at a height at which the disc can be transferred and ejected, the holder projecting portion 19a of the holder 19 is engaged with the tray projecting portion 12b of the tray 12 when the cam member 18 provided in vicinity of the tray 12 is turned, and then a part of the tray 12 is pushed down by the holder projecting portion 19a of the holder 19 when the cam projection 19b is moved along the cam groove 18a of the cam member 18, whereby the overall tray is bent slightly like a bow. In other words, since a part of the peripheral edge of the tray 12 is held movably by the elevator cam gears 11, a space S is formed as a clearance between an upper surface of the tray 12 and a lower surface of the disc 17 loaded on the tray 12 when a part of the tray 12 near the disc slot is pushed down to bend the tray 12. According to such configuration, a minute space S can be formed to such extent that the projecting portion 17a provided on the recording face side of the disc 17 is not stuck, by using such a simple mechanism that a part of the tray 12 is pushed down to bend the tray 12. As a result, a size reduction of the main body 10 can be made easy.

It is feared that, in transferring/ejecting the disc 17, the projecting portion 17a provided on the recording face side of the disc 17 comes into contact with an end surface of the hollow portion 12a of the tray 12 to cause an unstable operation. However, as described above, if the space S is formed between the upper surface of the tray 12 and the lower surface of the disc 17, such a situation that the projecting portion 17a provided on the recording face side of the disc 17 comes into contact with an end surface of the hollow portion 12a of the tray 12 can be avoided, and the smooth loading/ejection operation of the disc can be realized.

In the above explanation, as a means for pushing downward the tray projecting portion 12b of the tray 12 to form the space S between the upper surface of the tray 12 and the lower surface of the disc 17, the configuration that the holder projecting portion 19a is brought into contact with the tray projecting portion 12b by turning/driving the cam member 18 and the holder 19 is employed. But the space S can be formed by pushing down the tray projecting portion 12b via a lever, a slide cam, or the like.

Further, the tray 12 made of aluminum is used. But other flexible material such as a resin, or the like, for example, may be employed.

This application is based upon Japanese Patent Application (Patent Application No. 2005-235755) filed on Aug. 16, 2005; the contents of which are incorporated herein by reference.

With the above, various embodiments of the resent invention are explained. But the present invention is not limited to the matters set forth in the above embodiments, and variations and modifications made by those skilled in the art based on the description of the specification and the well known technologies are acceptable to the present invention and are contained in a scope over which a protection is sought.

INDUSTRIAL APPLICABILITY

As described above, the disc device of the present invention utilizes the tray that is shaped into an almost hollow circular disc and thus can ensure the rigidity of the tray and also can provide the space by bending the tray to avoid the contact between the projecting portion on the lower face of the disc and the tray, and is useful to the multiple-disc changer type disc device whose size is small and whose operation is stable, or the like.

The invention claimed is:

1. An optical disc device, comprising:
   a plurality of trays for loading discs thereon respectively;
   a tray holding member that holds the plurality of trays in a stacked manner so as to be movable; and
   a cam member positioned to releasably contact one of the plurality of trays, the contact between the cam member and the one of the plurality of trays creating a space between the one of the plurality of trays and a first disc loaded on the one of the plurality of trays while the first disc is loaded on the one of the plurality of trays.

2. The optical disc device according to claim 1, wherein the one of the plurality of trays has a flexible portion, and the contact comprises bending the flexible portion with the cam member in a stacking direction of the plurality of trays.

3. The optical disc device according to claim 2, wherein the cam member engages with the one of the plurality of trays in loading or ejecting the disc.

* * * * *